United States Patent [19]

Narayan et al.

[11] Patent Number: 4,937,691
[45] Date of Patent: Jun. 26, 1990

[54] RECORDING AND/OR REPRODUCING APPARATUS FOR CONTROLLING THERMAL EXPANSION PROBLEMS IN DISK DRIVES

[75] Inventors: Sankar B. Narayan, White Bear Lake, Minn.; Felix P. Lau, Austin, Tex.; Takehiko Saito, Yokohama, Japan

[73] Assignee: Minnesota Mining and Manufacturing Company, St. Paul, Minn.

[21] Appl. No.: 185,059

[22] Filed: Apr. 22, 1988

[51] Int. Cl.⁵ .............................................. G11B 5/012
[52] U.S. Cl. .................................................... 360/97.01
[58] Field of Search ........................... 360/97.01-97.04, 360/106, 137

[56] References Cited

U.S. PATENT DOCUMENTS

| | | | |
|---|---|---|---|
| 3,723,980 | 3/1973 | Gabor | 360/97.02 X |
| 4,665,453 | 5/1987 | Mikamoto | 360/106 X |
| 4,823,213 | 4/1989 | Naruki | 360/106 X |

Primary Examiner—A. J. Heinz
Attorney, Agent, or Firm—Donald M. Sell; Walter N. Kirn; David W. Anderson

[57] ABSTRACT

A drive for a recording disk includes a drive motor and a head transport mounted on a chassis which has a coefficient of expansion equal to that of the disk to reduce tracking errors caused by differential expansion of the chassis and the disk due to environmental changes.

1 Claim, 1 Drawing Sheet

RECORDING AND/OR REPRODUCING APPARATUS FOR CONTROLLING THERMAL EXPANSION PROBLEMS IN DISK DRIVES

BACKGROUND OF THE INVENTION

1. Field of the Invention This device relates generally to a recording and/or reproducing apparatus for magnetic disks which include polymeric sheets stretched over disk-like base plates.

2. Description of the Prior Art

A relatively new medium for mass data storage is known as a stretched surface recording (SSR) disk wherein at least one thin polymeric film is stretched across and attached to a circular base plate which is inflexible compared to the film.

A recording and/or reproducing apparatus (drive) for such a disk includes a drive motor for rotating the disk and a transfer mechanism for moving the recording head, all secured to a chassis. When the disk is mounted on the drive and driven by the drive motor, the head in proximity to the magnetic sheet is moved in the radial direction of the disk to transfer information to and from the disk.

However, when data transfer is performed by the above-mentioned drive, tracking errors are often produced due to changes of temperature.

The base plate of the magnetic disk is molded from synthetic resin, whereas the chassis of the drive is made of metal, so that expansion and contraction of the chassis due to temperature or humidity changes are smaller than those of the base plate. Hence, positional errors are produced between the track on the magnetic sheet which is secured to the base plate, and the head held by the transfer mechanism which is secured to the chassis.

As the tracks of the magnetic disk tend to become denser so as to enable the disk to perform high density recording, a complex servo-mechanism will become necessary to overcome tracking errors produced by environmental changes.

SUMMARY OF THE INVENTION

Tracking errors due to environmental changes are reduced or eliminated by providing an improved recording and/or reproducing apparatus including a drive motor, at least one magnetic head and transfer mechanism for moving the head with respect and in proximity to a magnetic disk comprising a disk-like base plate molded from synthetic resin and at least one magnetic sheet stretched over at least one side of and in parallel with the base plate, wherein at least both of said drive motor and said transfer mechanism are secured to a chassis, and said chassis is made of a material having substantially the same coefficient of thermal expansion as the base plate of said magnetic disk.

BRIEF DESCRIPTION OF THE DRAWINGS

The novel features and advantages of the present invention will become more apparent to those skilled in the art upon consideration of the following detailed description which refers to the accompanying drawings wherein.

DESCRIPTION OF THE PREFERRED EMBODIMENT

Figure 1:
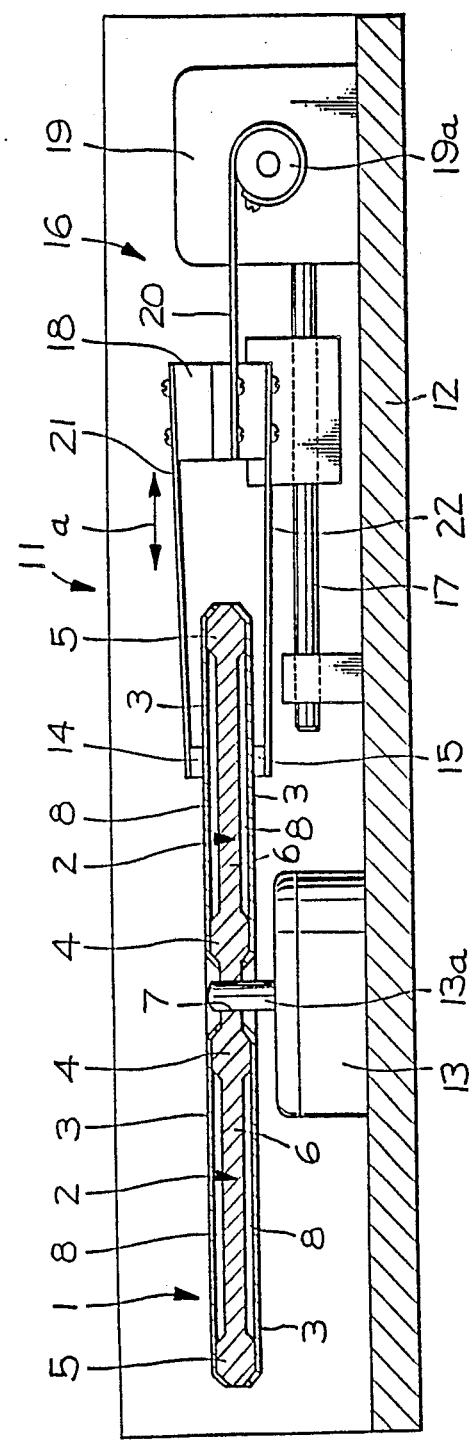
FIG. 1 shows a side view, partly broken away and in cross-section, of a recording and/or reproducing apparatus for a magnetic disk according to the present invention.

A magnetic disk 1 comprises a base plate 2 and magnetic sheets 3. The disk-like base plate 2 is molded of synthetic resin, has an inner annular projection 4, an outer annular projection 5 and flat portions 6. Further, an insertion hole 7 for the shaft 13a of a drive motor 13 is provided at the center of the base plate 2.

The inner perimeter and the outer perimeter of each magnetic sheet 3 are respectively fixed to the inner annular projection 4 and the outer annular projection 5 on each surface of the base plate 2 with adhesives, by welding or the like, so that the magnetic sheets 3 are stretched over the base plate 2 in parallel therewith to provide gaps 8 between the magnetic sheets 3 and the flat portions 6 of the base plate 2.

Resins suitable for base plate 2 include thermoplastics such as polyester, polycarbonate, polysulfone and polyphenylene sulfide, and thermosets such as epoxy, polyester and polyurethane. The preferred resin is an amorphous plastic, polyetherimide. It has high rigidity and is excellent in heat resistance and dimensional stability. The coefficient of thermal expansion of polyetherimide is $47$–$56 \times 10^{-6}$ in./in./° C. and $21$–$25 \times 10^{-6}$ in./in./° C. when 20% fiber glass and 20% mica are incorporated.

In a recording and/or reproducing apparatus 11 for the above magnetic disk 1, the drive motor 13 for rotating the magnetic disk 1, and a transfer mechanism 16 for moving a pair of upper and lower heads 14 and 15 are mounted on a chassis 12.

The transfer mechanism 16 comprises a movable table 18 guided by a guide shaft 17 which is supported by the chassis 12, the movable table 18 being moved in the radial direction of the magnetic disk 1 (in direction of arrow a); a stepping motor 19 for moving the heads 14 and 15; and a steel belt 20 connected to the movable table 18 and a motor pulley 19a which is secured to the motor 19. The heads 14 and 15 are respectively held by a pair of upper and lower arms 21 and 22 which are leaf springs or the like.

The chassis 12, on which the drive motor 13 and the transfer mechanism 16 are mounted, is made of a material having substantially the same coefficient of thermal expansion as the synthetic resin used for the base plate 2 of the magnetic disk 1. In the preferred embodiment, the chassis 12 is made of the same synthetic resin, polyetherimide, as the base plate 2.

To mount the magnetic disk 1 on the recording and/or reproducing apparatus 11, the shaft 13a of the drive motor 13 is first fitted into the insertion hole 7 of the magnetic disk 1, and then the heads 14 and 15 are brought into proximity with the respective upper and lower magnetic sheets 3 of the magnetic disk 1.

When the magnetic disk 1 is rotated at high speed by the drive motor 13, the movable table 18 is moved in the direction of arrow a by the motor 19 of the transfer mechanism 16. As the result, the heads 14 and 15 are moved in the radial direction of the magnetic disk 1. Thus, information transfer is performed with respect to the magnetic disk 1.

Since the chassis 12 of the apparatus 11 is made of the same synthetic resin as the base plate 2 of the magnetic disk 1, the expansion and contraction of the chassis 12 and the base plate 2 due to changes in temperature are equal. Hence, positional errors between the tracks on the magnetic sheet 3 and the heads 14 and 15 on the transfer mechanism 16 are reduced.

Having described an illustrative embodiment of the invention with reference to the accompanying drawing, it is understood that the invention is not limited to that precise embodiment, and that various changes and modifications may be effected therein. For example, the chassis 12 may be made of metal or the like, if the coefficient of thermal expansion of such metal or the like is substantially equal to that of synthetic resin of the base plate 2.

We claim:

1. In a recording and/or reproducing apparatus including a drive motor, at least one magnetic head and transfer mechanism for moving the head with respect and in proximity to a magnetic disk comprising a disk-like base plate molded from synthetic resin and at least one magnetic sheet stretched over at least one side of and in parallel with the base plate, the improvement wherein at lest both of said drive motor and said transfer mechanism are secured to a chassis, and said chassis is made of the same synthetic resin as that of the disk-like base plate of said magnetic disk.

* * * * *

UNITED STATES PATENT AND TRADEMARK OFFICE
CERTIFICATE OF CORRECTION

PATENT NO. : 4,937,691

DATED : June 26, 1990

INVENTOR(S) : SANKAR B. NARAYAN, FELIX P. LAU AND TAKEHIKO SAITO

It is certified that error appears in the above-identified patent and that said Letters Patent is hereby corrected as shown below:

Claim 1, Column 4, line 8, correct the spelling of "lest" to --least--.

Signed and Sealed this

Twenty-first Day of July, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,937,691

DATED : June 26, 1990

INVENTOR(S) : SANKAR B. NARAYAN, FELIX P. LAU AND TAKEHIKO SAITO

It is certified that error appears in the above-identified patent and that said Letters Patent is hereby corrected as shown below:

Title Page : Add "and SONY Corporation to Assignee

Should read as follows:

[73] Assignee: Minnesota Mining and
Manufacturing Company,
Saint Paul, Minnesota
and SONY Corporation,
Tokyo, Japan Signed and Sealed this Ninth Day of February, 1993

Attest:

STEPHEN G. KUNIN

Attesting Officer     Acting Commissioner of Patents and Trademarks